Patented Nov. 3, 1936

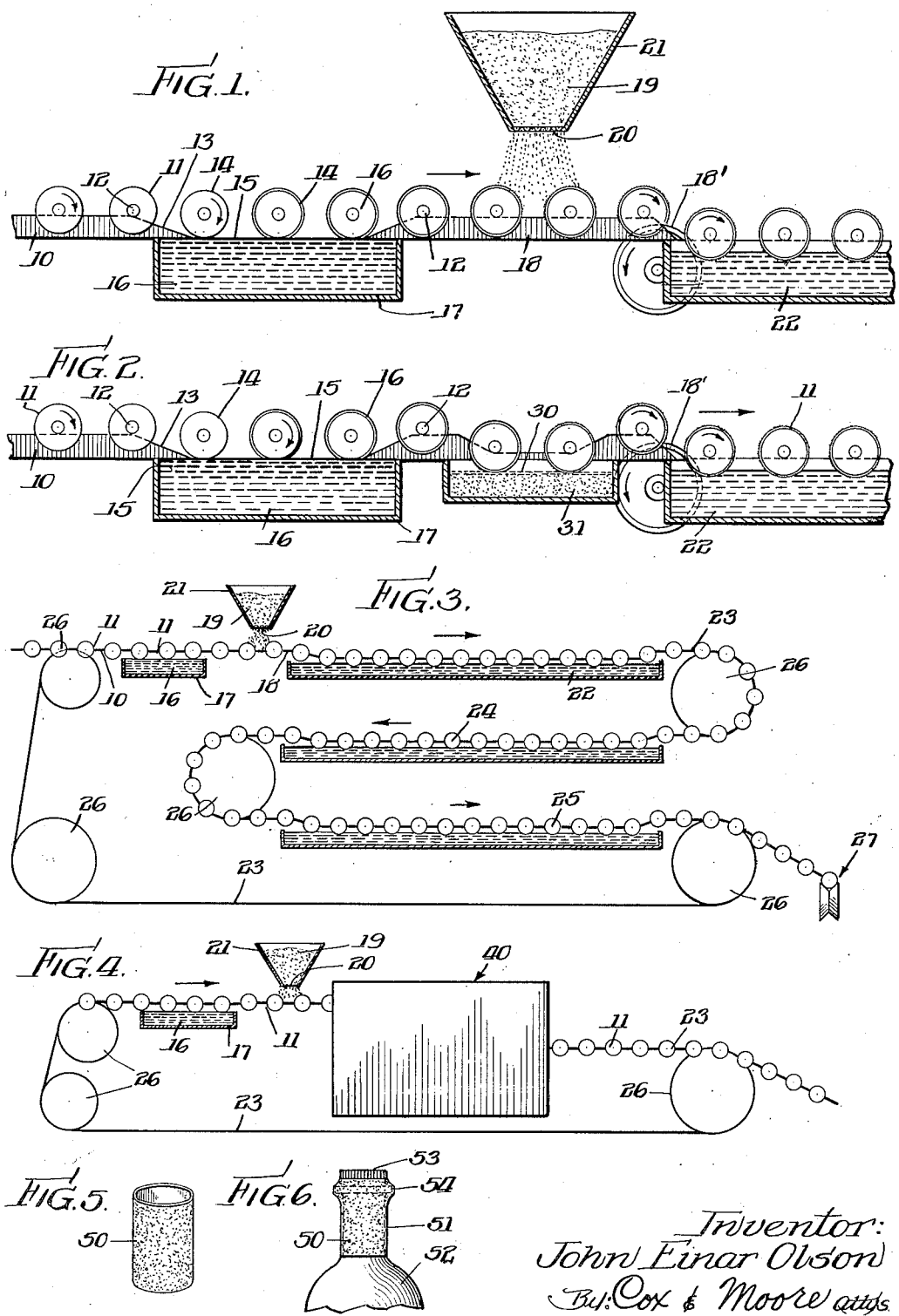

2,059,897

UNITED STATES PATENT OFFICE 2,059,897

CLOSURE FOR CONTAINERS AND METHOD OF MAKING

John Einar Olson, Madison, Wis., assignor to The Celon Company, Madison, Wis., a corporation of Wisconsin Application February 13, 1933, Serial No. 656,516

15 Claims. (Cl. 18—57)

This invention relates to an article for sealing bottles and other like containers, and particularly articles made from solutions of substances, such as solutions of cellulose and its derivatives or commercial gelatin. More specifically, the invention relates to the method of making tubes or bands from such solutions, such as viscose or jelly.

The primary object of the present invention is to provide a tubular article made upon a mold to provide a thin film of an adhesive solution, such as viscose or gelatin, on the mold by rolling the mold across a surface of the solution and then regenerating or solidifying the viscous material by passing the same through chemical baths, or by heat treating, depending upon the kind and nature of the adhesive solution used.

A further object is the method of making articles which consists in rolling a cylinder mold over the top of a substance or adhesive solution to coat the exterior surface of the mold, rotating the mold in the air in its horizontal position to obtain a uniform thickness of substance or solution on the mold, applying a pigment, such as mica, about the exterior surface of the film during the rotary movement of the mold, and then regenerating or solidifying the substance or solution by passing the mold and the film thereon through chemical baths, if the substance or solution used is viscose; or temperature treating the film on the mold, if gelatin is used, to solidify the substance or solution.

A specific object of the invention is the method of providing cellulose bands or tubes which consists in continuously passing a plurality of spaced rollers over the surface of viscose material by rolling the rollers thereover and in contact with the viscose to provide a viscose film about the rollers, rotating the rollers at a higher speed after the viscose film is on the rollers to obtain a uniform film thickness, then applying a coating of pigment, such as mica, to the exterior surface of the film either by dusting the pigment on the rolls as they rotate and translate past a pigment dusting hopper, or by rolling the film coated roller over a bed of pigment, then passing the coated film through successive chemical baths to regenerate the viscose into hydrated cellulose bands or tubes.

Numerous other objects and advantages will be apparent throughout the progress of the following specification.

The accompanying drawing illustrates various steps in the method employed in carrying out the method and the views therein are as follows:

Fig. 1 is a diagrammatic view showing one form in which the coated articles may be made.

Fig. 2 is a similar view showing a modified arrangement for surface coating the film.

Fig. 3 is a diagrammatic view showing the manner in which cellulose tubes or bands may be made.

Fig. 4 is a diagrammatic view showing the manner in which jelly tubes may be made.

Fig. 5 is a detail perspective view of the improved coated opaque or metallic appearing band.

Fig. 6 is a detail elevation showing the tube or band applied on a bottle after the tube or band is dehydrated.

In the manufacture of bands or tubes for sealing closures of bottles and like receptacles it has been found desirable and convenient to make the bands in a continuous operation by continuously rotating cylindrical molds over an adhesive solution to provide a film of the solution on the exterior surface of each mold. When the molds pass over the solution, they are rotated at a relatively slow speed to insure a proper amount of the substance to adhere to the molds. Immediately after the molds are filmed, they are rotated in the air to insure a uniform thickness of film. The molds, while so rolling, may, if desired, be surface coated with a pigment, such as mica.

The pigment may be either sprayed on the molds, as shown in Fig. 1, or rolled over the surface of a bed of powdered pigment so that the exterior surface of the mold will be coated with the pigment. After the pigment is applied to the film, whether by the rolling or dusting operation, the film is then solidified. The process for solidifying the film varies depending upon the kind of solution used.

Referring to the drawing, and particularly Figs. 1 to 3 thereof, 10 designates a rail or other support upon which tubular molds or rollers 11 rotate, in the direction shown by the arrows. The molds 11 have shafts 12 which are continuously moved and rotate on the rail 10. Various machines or mechanism may be employed to cause this translation and rotation of the molds. An apparatus disclosing one form for continuously moving and rotating the molds is shown and described in a copending application, Serial No. 585,578, filed Aug. 17, 1933. As the molds 11 are translated and rotated along the rail 10, they pass down the incline 13 so that their exterior surfaces 14 will contact with the liquid level 15 of the substance 16 which is in the container 17. The molds 11 rotate slowly over the surface of the substance as they are rotating on their exterior surfaces while passing over the substance. This arrangement causes a thin film 16 to be formed about each mold. The molds are then raised so that they will again rotate on their axes 12, thereby rotating faster than they rotate across the surface of the substance 16. This faster rotation of the molds causes the film thereon to obtain a uniform thickness. As the molds pass along the rail 18, they are dusted with pigment 19 which passes through the screen 20 of an agitated hopper 21. If the adhesive solution used is viscose, the molds, after being coated with the pigment, are passed into a chemical bath 22 where the viscose is coagulated. As the molds enter the first chemical bath rotary means 18' are provided to advance the rotary motion of the molds so that the film on the molds will become immediately and quickly immersed. The rollers, which are translated by a chain 23, Fig. 3, pass successively into baths 24 and 25. The bath 24 further coagulates the viscose film, while the bath 25 causes complete regeneration of the viscose and provides a tube of regenerated cellulose about the exterior surface of each roller. The chain 23 is continuous in operation and passes over pulleys 26 which have operable communication with a stripper element 27, Fig. 3. One form of the stripper element is shown and described in the aforesaid copending application. The stripper element causes the tubular regenerated film to be stripped from the rollers. After the stripping operation, the same cycle of operation is repeated.

Instead of dusting the pigment 19 onto the rotating rollers as shown in Fig. 1, the rollers, after becoming filmed, may pass over the surface 30 of a mica bed 31. The rotation of the rollers over this pigment bed causes the viscose to pick up sufficient material to coat the outer surface thereof. After the surface coat is applied, the rollers are moved to the chemical baths where the film is regenerated into cellulose in the usual conventional manner.

If the adhesive solution is jelly, as shown in Fig. 4, the rollers pass through a temperature room or compartment 40 where the gelatin becomes solidified. The molds, after leaving the compartment 40, are connected by the chain 23 to stripping position. After the coated film on the molds has been regenerated, the film is cut into proper lengths to provide an opaque exteriorly coated metallic appearing band or tube 50, Fig. 5. These bands may then be dyed to suitable color in the usual conventional manner.

The bands 50, if of cellulose, are kept in hydrated condition by packing or preserving them in a liquid bath. If the bands 50 are made of jelly, the jelly may be dehydrated and packed dry for shipping purposes. However, before the jelly bands can be placed over the containers, they are hydrated by immersing in water or other liquid where they will swell and become pliable. Thus, the band 50, whether made of cellulose or of jelly, is hydrated before it is slipped over the neck 51 of the bottle 52. The band, when in place, and after dehydration, will have shrunk about the neck of the bottle and the cap 53 and provide an air-tight seal between the bottle and the cap. The band 50, when dehydrated and shrunk in position, gives the bottle a highly pleasing and ornamental appearance, prevents tampering with the contents of the bottle and prevents contamination about the lip of the bottle during handling thereof. Also, the band protects the annular lip 54 of the bottle.

Highly ornamental tubes may also be made to produce striped or mottled appearances and effects by the addition of one or more trays carrying a pigment 31. The trays may carry different kinds of pigment. Therefore, when the rollers 11, Fig. 2, are filmed, they may roll in the pigment 31 for a short period of time to coat only a portion of the surface, another part of the surface being coated with a different kind of pigment, for example, powdered glass. The positioning of the pigment carrying trays may be so arranged and the rollers may be so arranged relative to the pigment that the film will have alternate coated and transparent surfaces, the coated surfaces being of different pigment, or the entire surface may be coated with different kinds of pigment.

The invention provides a continuous method for making a plurality of open end tubular or cylindrical bands by a continuous process and equalizing the film and coating the film prior to regeneration. The product has considerable shrinking capabilities and may be striped, mottled or completely coated, as desired.

Changes may be made in the form, construction, and arrangement of the articles, and the method of making the bands as well as the method of coating the bands may be changed to various degrees without departing from the spirit or scope of the invention as set forth in the appended claims.

The invention is hereby claimed as follows:

1. The method of making cylindrical bands or tubes from compounds, such as viscose, which consists in rolling molds over a surface of the solution of one of the compounds to provide a film of the solution on the molds, and then regenerating the solution into a solid.

2. The method of making cylindrical bands or tubes from compounds, such as viscose, which consists in rolling a mold over a surface of the solution of one of the compounds to provide a film of the solution on the mold, rotating the mold in horizontal position to obtain a uniform thickness of the film on the mold, then applying a pigment to the film while the mold is rolling, and finally regenerating the film.

3. The method of making cylindrical bands or tubes from compounds, such as viscose, which consists in rolling a mold over a surface of the solution of one of the compounds to provide a film of the solution on the mold, rotating the mold in horizontal position to obtain a uniform thickness of the film on the mold, then applying a pigment to the film while the mold is rolling, then regenerating the film and forming a relatively long tube, and finally removing the tube from the mold.

4. The method of making cylindrical bands or tubes which consists in rolling a mold over a solution of compounds, such as viscose, to provide a tubular film of the solution on the mold, rotating the mold in horizontal position to obtain a uniform thickness of the film on the mold, then applying a pigment to the tubular film while the mold is rolling, then regenerating the solution to form a relatively long tube, then removing the tube from the mold, and finally cutting the tube to the desired lengths to form bands.

5. The method of making cylindrical bands or tubes from compounds, such as viscose, which consists in rolling a mold over a surface of a solution of one of the compounds adhesive to the mold to provide a tubular film of the solution on the mold, rotating the mold in horizontal position to obtain a uniform thickness of the film on the mold, then applying a pigment to the tubular film while the mold is rolling, then regenerating the solution to form a relatively long tube, then removing the tube from the mold, then cutting the tube to the desired lengths to form bands, and finally dyeing the bands.

6. The method of making hydrated cylindrical bands or tubes which consists in rotating a mold at a predetermined speed across the surface of a solution of compounds, such as viscose, to provide a film of the substance on the mold, rotating the mold at an increased speed after the mold is filmed to obtain a uniform thickness of the film, and finally regenerating the film.

7. The method of making hydrated cylindrical bands or tubes which consists in rotating a mold at a predetermined speed across the surface of a solution of compounds, such as viscose, to provide a film of the substance on the mold, rotating the mold at an increased speed after the mold is filmed to obtain a uniform thickness of the film, and then further increasing the rotary speed of the mold as it moves to regenerating position.

8. The method of making hydrated cylindrical bands or tubes which consists in rotating a mold at a predetermined speed across the surface of a solution of compounds, such as viscose, to provide a film of the substance on the mold, rotating the mold at an increased speed after the mold is filmed to obtain a uniform thickness of the film, then coating the film on the mold with a pigment, and finally rotating the mold at higher speed during regeneration of the film.

9. The method of making cylindrical tubes or bands for bottles and the like which consists in passing a tubular mold at a predetermined rotary speed over a solution of compounds, such as viscose, to provide a film of the substance on the mold, increasing the rotary speed of the mold after the film is formed thereon, applying a surface coat of pigment to the film, then increasing the rotary speed of the mold, and finally regenerating the film.

10. The method of making jelly cylindrical tubes from a solution of compounds, such as viscose, which consists in rolling a mold in contact with the substance to form a tubular film of the substance on the mold, rotating the mold to obtain a uniform thickness of the film and then regenerating the film.

11. The method of making hydrated cylindrical bands or tubes which consists in rotating a mold at a predetermined speed across a surface of viscose to provide a film of the viscose on the mold, rotating the mold at an increased speed after the film is on the mold to obtain a uniform thickness of the film on the mold, then coating the viscose film on the mold with powdered mica, then passing the coated viscose film through a chemical bath while the film is still on the mold to finally regenerate the film.

12. The method of making cylindrical bands or tubes which comprises rotating a mold at a predetermined speed through a solution of viscose to provide a film thereon, passing the mold over a surface containing a powdered metallic pigment, rotating the mold at increased speed to provide an even distribution of film, passing the mold through a regenerating solution, and stripping the solution or tube from the mold.

13. The method of making cylindrical tubes or bands for bottles and the like, which consists in passing a tubular mold at a predetermined rotary speed through a gelatinous solution comprising a substance capable of being solidified on the application of heat, rotating the molds through said solution so as to obtain a film thereon, passing the molds out of solution, rotating them at an increased rate of speed so as to render the film thereon uniform over the entire surface of the mold, regenerating the film on the mold by passing the mold and the film together through a heated oven, and stripping the regenerated film from the mold.

14. The method of making cylindrical bands or tubes from compounds, such as viscose, which consists in rolling a mold over a surface of the solution of one of the compounds to provide a film of the solution on the mold, rotating the mold in horizontal position to obtain a uniform thickness of the film on the mold, then applying a pigment to the film while the mold is rolling, and finally solidifying the film.

15. The method of making cylindrical bands or tubes from compounds, such as viscose, which consists in rolling a mold over a surface of the solution of one of the compounds to provide a film of the solution on the mold, rotating the mold in horizontal position to obtain a uniform thickness of the film on the mold, then applying a pigment to the film while the mold is rolling, then solidifying the film and forming a relatively long tube, and finally removing the tube from the mold.

JOHN EINAR OLSON.